United States Patent [19]

Zucchero

[11] Patent Number: 5,113,975
[45] Date of Patent: May 19, 1992

[54] BICYCLE RIM WATER REFLECTING APPARATUS

[76] Inventor: Rocco Zucchero, 10711 5th Ave. Cutoff, Countryside, Ill. 60525

[21] Appl. No.: 680,126

[22] Filed: Apr. 3, 1991

[51] Int. Cl.$^5$ ............................................. B62L 1/02
[52] U.S. Cl. ................................. 188/24.12; 193/344
[58] Field of Search ......................... 188/24.12–24.22, 188/71.1, 73.1, 218 A, 250 G, 344, 24.11, 382

[56] References Cited

U.S. PATENT DOCUMENTS

| | | | |
|---|---|---|---|
| 3,993,174 | 11/1976 | Williams et al. | 188/344 |
| 4,230,208 | 10/1980 | Gale | 188/24.12 X |
| 4,667,778 | 5/1987 | Ozaki | 188/24.12 |

FOREIGN PATENT DOCUMENTS 2166819  4/1986  United Kingdom ............ 188/24.12

*Primary Examiner*—Douglas C. Butler
*Assistant Examiner*—Alfred Muratori
*Attorney, Agent, or Firm*—Leon Gilden

[57] ABSTRACT

An apparatus in combination with a calliper organization for use in a braking system for a bicycle, wherein the apparatus includes a "U" shaped support collar pivotally mounted coaxially to a central pivot mount of the calliper organization, with a downwardly depending first and second collar leg, including a respective first and second foot member, wherein each foot member adjustably and pivotally mounts a respective first and second mounting leg. Each mounting leg mounts a primary flexible deflector blade longitudinally and forwardly of each mounting head, with each deflector blade including a forward edge directed interiorly of each respective planar surface of each mounting leg. Further, a secondary deflector blade may be utilized to enhance diverting of water from a bicycle rim deflected by the primary blades.

3 Claims, 4 Drawing Sheets

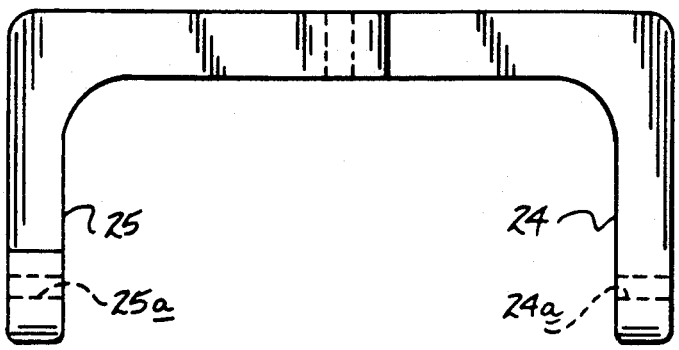
Fig 5
Fig 6
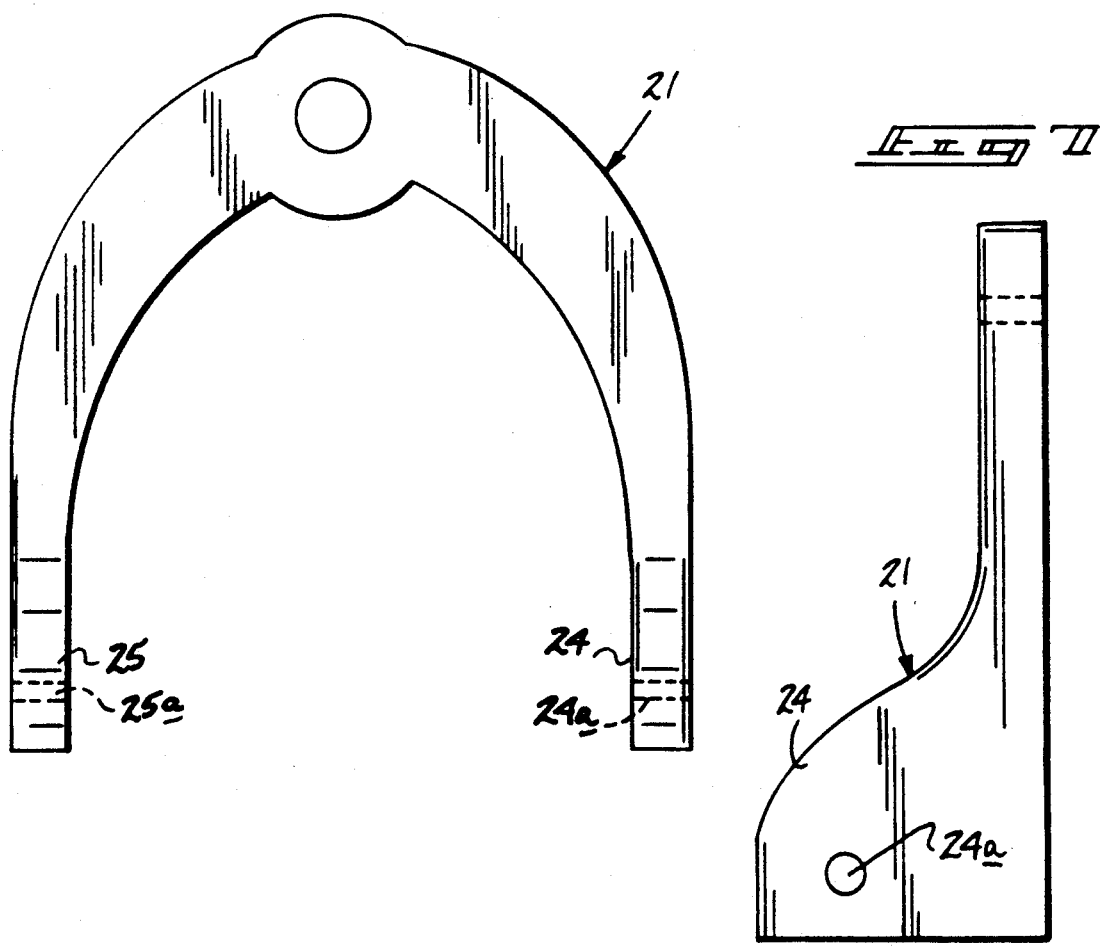
Fig 7
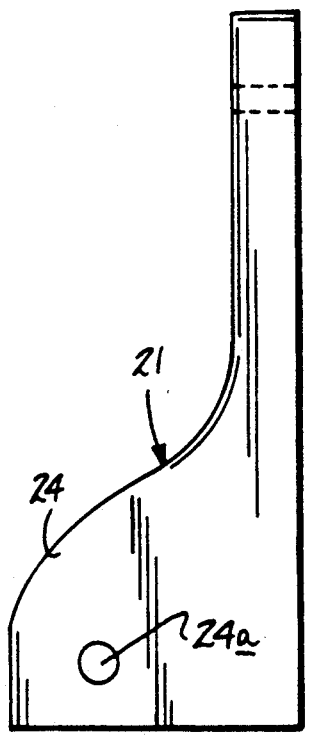

BICYCLE RIM WATER REFLECTING APPARATUS

BACKGROUND OF THE INVENTION

1. Field of the Invention

The field of invention relates to bicycle braking apparatus, and more particularly pertains to a new and improved bicycle rim water deflecting apparatus wherein the same is arranged to divert water from a bicycle rim prior to the rim effecting contact with brake shoes to enhance frictional engagement of the brake shoes with an associated tire rim.

2. Description of the Prior Art

Various braking systems are utilized in association with bicycles for effecting selective and operative stopping of the associated bicycle. Such apparatus is exemplified in U.S. Pat. No. 4,667,778 to Ozaki utilizing either a side or central bicycle calliper assembly.

U.S. Pat. No. 3,921,764 to Mathauser sets forth a further example of laterally positioned brake shoes mounted to a central yoke organization relative to a bicycle rim.

U.S. Pat. No. 3,809,187 to Grieve sets forth a further example of a side brake organization to effect braking of an associated bicycle.

As such, it may be appreciated that there continues to be a need for a new and improved bicycle rim water deflecting apparatus as set forth by the instant invention which addresses both the problems of ease of use as well as effectiveness in construction in diverting water prior to application of brake shoes in an associated bicycle calliper assembly and in this respect, the present invention substantially fulfills this need.

SUMMARY OF THE INVENTION

In view of the foregoing disadvantages inherent in the known types of bicycle braking apparatus now present in the prior art, the present invention provides a bicycle rim water deflecting apparatus wherein the same is arranged to deflect water from an associated bicycle rim prior to the bicycle brake shoes effecting frictional engagement with the rim. As such, the general purpose of the present invention, which will be described subsequently in greater detail, is to provide a new and improved bicycle rim water deflecting apparatus which has all the advantages of the prior art bicycle braking apparatus and none of the disadvantages.

To attain this, the present invention provides an apparatus in combination with a calliper organization for use in a braking system for a bicycle, wherein the apparatus includes a "U" shaped support collar pivotally mounted coaxially to a central pivot mount of the calliper organization, with a downwardly depending first and second collar leg, including a respective first and second foot member, wherein each foot member adjustably and pivotally mounts a respective first and second mounting leg. Each mounting leg mounts a primary flexible deflector blade longitudinally and forwardly of each mounting head, with each deflector blade including a forward edge directed interiorly of each respective planar surface of each mounting leg. Further, a secondary deflector blade may be utilized to enhance diverting of water from a bicycle rim deflected by the primary blades.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bicycle rim water deflecting apparatus which has all the advantages of the prior art bicycle braking apparatus and none of the disadvantages.

It is another object of the present invention to provide a new and improved bicycle rim water deflecting apparatus which may be easily and efficiently manufactured and marketed.

It is a further object of the present invention to provide a new and improved bicycle rim water deflecting apparatus which is of a durable and reliable construction.

An even further object of the present invention is to provide a new and improved bicycle rim water deflecting apparatus which is susceptible of a low cost of manufacture with regard to both materials and labor, and which accordingly is then susceptible of low prices of sale to the consuming public, thereby making such bicycle rim water deflecting apparatus economically available to the buying public.

Still yet another object of the present invention is to provide a new and improved bicycle rim water deflecting apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a top view of the "U" shaped support collar utilized by the instant invention.

FIG. 6 is an orthographic front view, taken in elevation, of the support collar as illustrated in FIG. 5.

FIG. 7 is an orthographic side view, taken in elevation, of the support collar as illustrated in FIGS. 5 and 6.

DESCRIPTION OF THE PREFERRED EMBODIMENT

Figure 1:
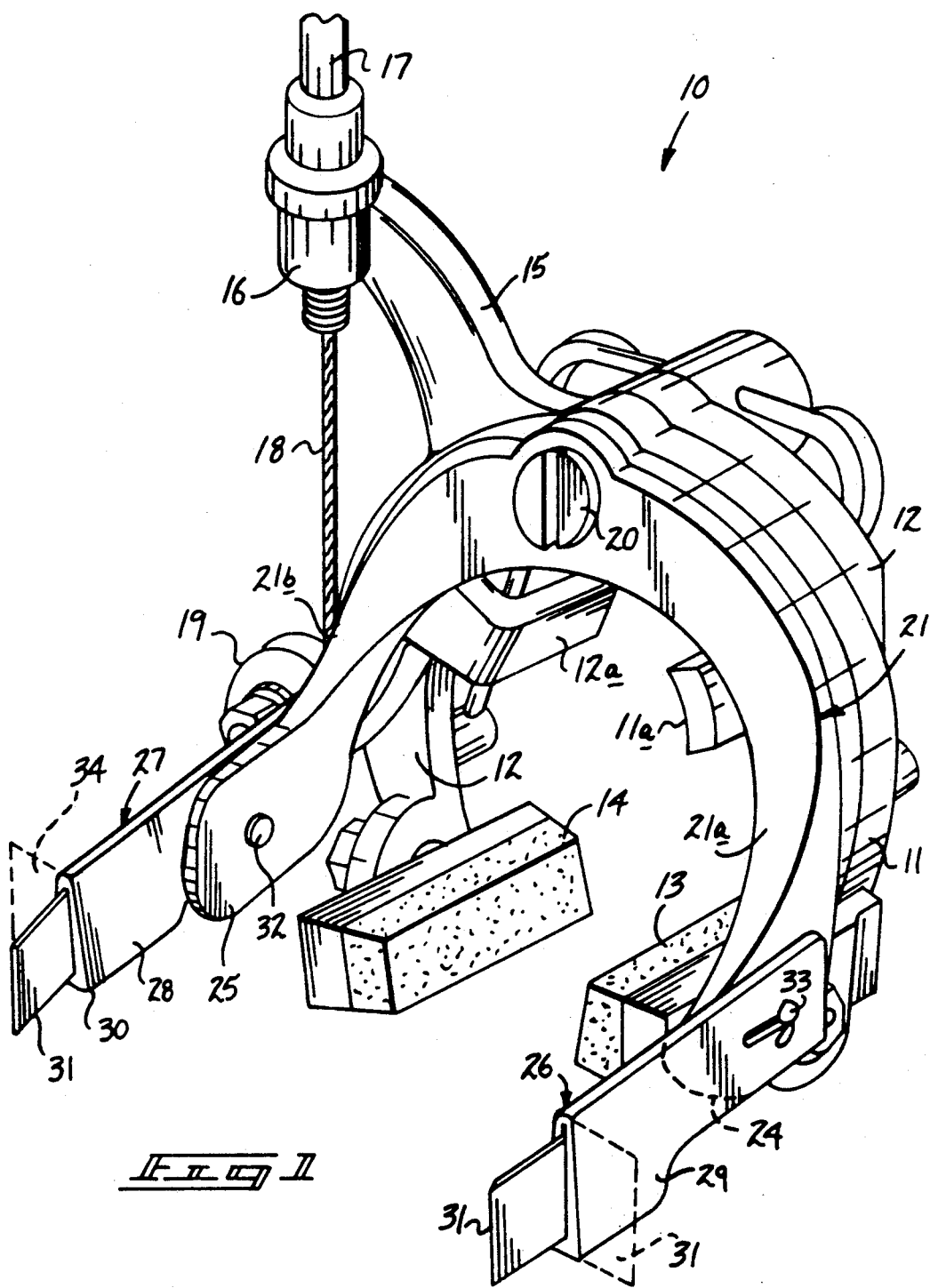
FIG. 1 is an isometric illustration of the instant invention.
Figure 2:
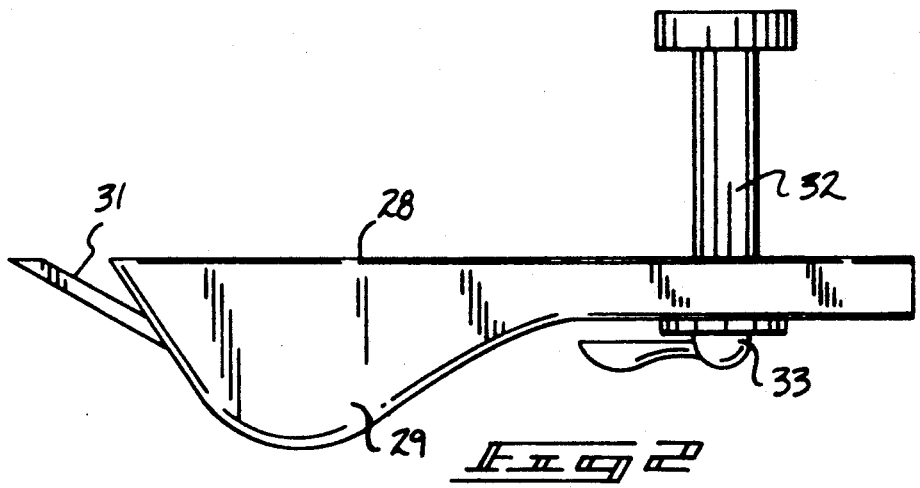
FIG. 2 is a top view of one of the plurality of mounting legs utilized by the instant invention.
Figure 3:
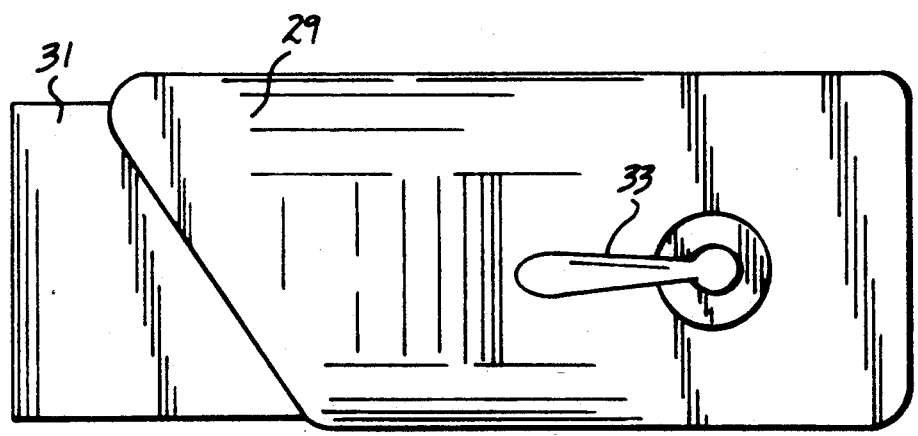
FIG. 3 is a side view of the mounting leg structure as illustrated in FIG. 2.
Figure 4:
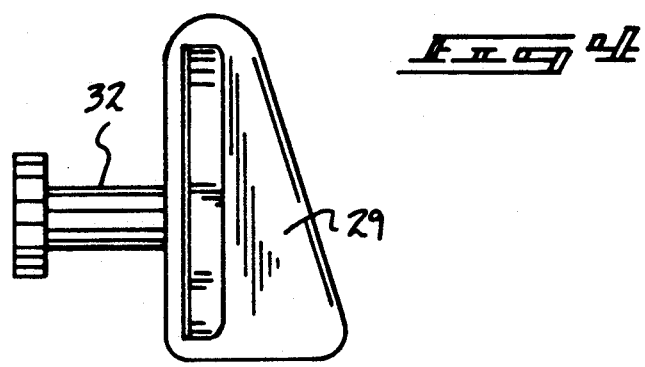
FIG. 4 is an end view of the mounting structure, as illustrated in FIGS. 2 and 3.
Figure 8:
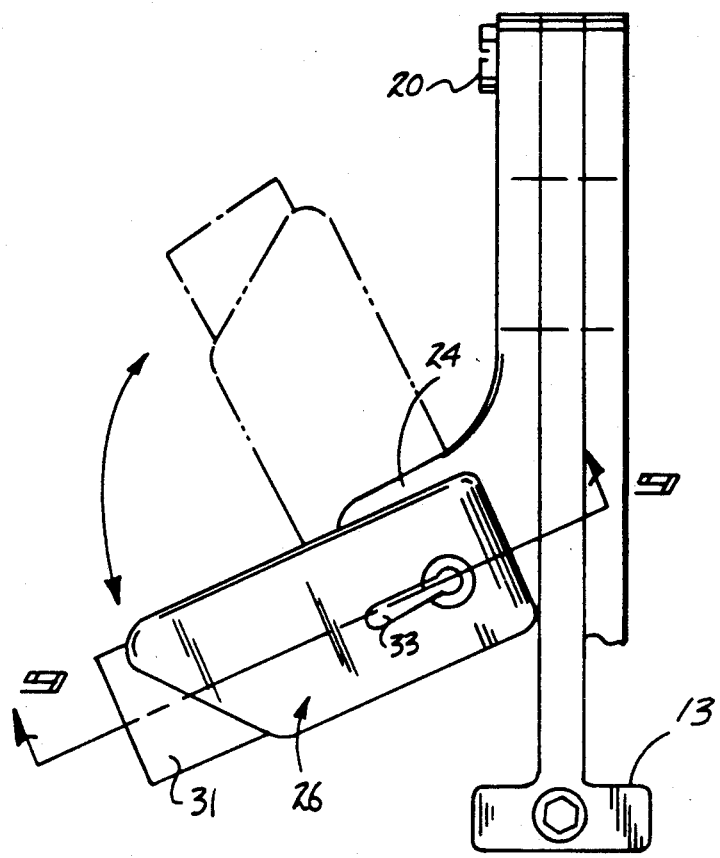
FIG. 8 is an orthographic side view of the instant invention mounted to an associated bicycle braking organization.
Figure 9:
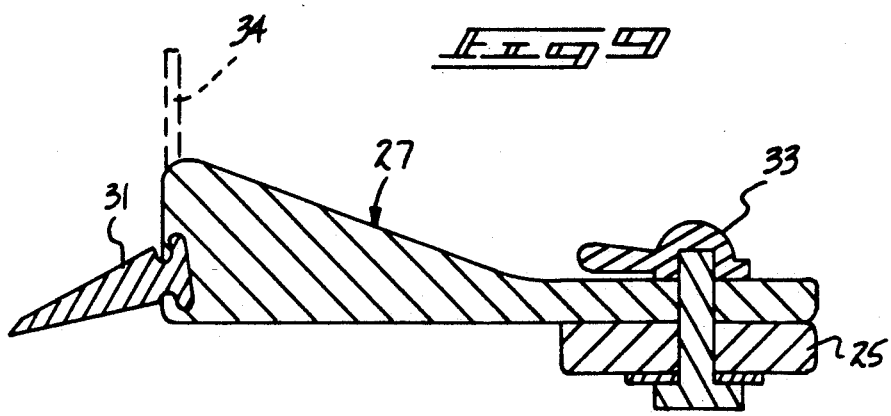
FIG. 9 is an orthographic view, taken along the lines 9-9 of FIG. 8 in the direction indicated by the arrows.

With reference now to the drawings, and in particular to FIGS. 1 to 9 thereof, a new and improved bicycle rim water deflecting apparatus embodying the principles and concepts of the present invention and generally designated by the reference numeral 10 will be described.

More specifically, the bicycle rim water deflecting apparatus 10 of the instant invention essentially comprises a bicycle braking assembly of a type as exemplified in U.S. Pat. No. 4,667,778 and incorporated herein by reference, utilizing a first calliper arm 11 and a second calliper arm 12. The first calliper arm utilizes a first arm support 11a mounting a first brake shoe 13 thereon. The second calliper arm 12 utilizes a second arm support 12a mounting a second brake shoe 14, wherein the first and second brake shoes 13 and 14 cooperate with one another to engage opposed side surfaces of a bicycle rim (not shown). The second arm 12 includes a second arm extension leg 15 formed with a boss member 16 receiving a cable sheath 17 in a fixed relationship, with a cable 18 slidably mounted within the cable sheath 18, wherein a free lower terminal end of the cable 18 is mounted to a cable boss 19 mounted to the first arm 11 spaced below the second arm extension leg 15. A pivot axle 20 is medially directed through the first and second cable arms 11 and 12 and forms a pivot axis about which the arms pivot. To this pivot axle 20, a "U" shaped support collar 21 is mounted medially of its "U" shaped configuration, including a first collar leg 21a and a second collar leg 21b defining the opposed legs of the "U" shaped collar. The first collar leg 21a mounts a first collar leg foot at a lower terminal end thereof, wherein the first collar leg foot 24 extends orthogonally relative to the first collar leg 21a. The second collar leg 21b in a similar manner mounts a second collar leg foot 25 orthogonally oriented to a lower terminal end of the second collar leg 21b. The respective first and second foot members include coaxially aligned first and second bores respectively through the respective first and second collar legs. Each of the first and second bores rotatably mount a clamping boss 32 therethrough, wherein each clamping boss 32 is mounted through a respective first and second bore of each foot 24 and 25 and secures a respective first and second mounting leg 26 and 27 to each respective first and second foot 24 and 25. Each respective first and second mounting legs 26 and 27 includes a planar interior surface 28, wherein each surface 28 is in a confronting relationship relative to one another, with a forward terminal end of each respective first and second mounting leg 26 and 27 integrally mounting a respective first and second mounting head 29 and 30. Each mounting head 29 and 30 includes a planar forward surface that is orthogonally oriented relative to each planar interior surface 28, with a primary flexible deflector blade 31 extending forwardly of each mounting head, with the primary flexible deflecting blade 31 defining an obtuse included angle between each primary flexible deflector blade 31 and a respective planar interior surface 28 of each mounting leg 26 and 27. The clamping boss 32 extends through an associated opening within each mounting leg, with a fastener 33 securing each mounting leg in a respective angular orientation to position each primary deflector blade in confrontation with a bicycle rim to effect deflection of water from a bicycle rim prior to the rim being engaged by the opposed first and second brake shoes 13 and 14. Optionally, a second flexible deflector blade 34 is mounted and extends exteriorly and laterally of each mounting leg 26 and 27 to define an obtuse included angle between the primary and secondary flexible deflector blades 31 and 34. The second deflector blades 34 enhance deflection of water engaged by forward blade edge of each primary flexible deflector blade 31 to rid excess moisture from a bicycle rim prior to it being engaged by the brake shoes.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bicycle rim water deflecting apparatus, comprising in combination,
    a first arcuate calliper arm and second calliper arm, wherein each first and second arcuate calliper arms are pivotally mounted relative to one another by a pivot axle, and the second calliper arm including an extension leg mounting a boss member, with the boss member securing a cable sheath thereto, the cable sheath slidably receiving a cable through the cable sheath, with the cable including a lower cable end mounted to the first calliper arm to effect relative pivotment of the first calliper arm relative to the second calliper arm, and the first calliper arm mounting a first brake shoe at a lower terminal end thereof, and the second calliper arm mounting a second brake shoe at a lower terminal end thereof, and a U shaped support collar, the U shaped support collar including a first collar leg and a second collar leg, with the U shaped support collar mounted to the pivot axle medially of the U shaped support collar, and the U shaped support collar including a first collar leg foot and a second collar leg foot, with each first and second respective collar leg foot mounted to a lower terminal end of each respective first and second collar leg, and each first and second collar leg foot orthogonally oriented relative to each respective first and second collar leg and the first and second collar leg foot pivotally mounting a respective first and second mounting leg thereto, and the first mounting leg and the second mounting leg each including a confronting planar interior surface, and each mounting leg including a planar forward surface, with the planar forward surface orthogonally oriented relative to the planar interior surface and the planar forward surface includes a primary flexible deflector blade mounted within each planar forward surface.

2. An apparatus as set forth in claim 1 wherein each flexible deflector blade defines an obtuse included angle between each respective primary flexible deflector blade and each planar interior surface of each respective first and second mounting leg.

3. An apparatus as set forth in claim 2 wherein each of the mounting legs includes a clamping boss orthogonally oriented relative to each planar interior surface and directed through each respective foot of the first and second collar leg foot, and the clamping boss including a fastener member mounted to the clamping boss exteriorly of each mounting leg to permit relative rotation of each mounting leg relative to each collar leg foot, and further including a second flexible deflector blade mounted to each mounting leg adjacent the primary flexible deflector blade of each mounting leg, wherein the secondary flexible deflector blade defines an obtuse included angle between the second flexible deflector blade and the primary deflector blade, and each second flexible deflector blade extends exteriorly of each mounting leg in an opposed orientation relative to each planar interior surface.

* * * * *